United States Patent [19]

McNaney

[11] 4,251,806
[45] Feb. 17, 1981

[54] MESSAGE CHARACTER IMAGE PROJECTION CONTROL SYSTEM

[76] Inventor: Joseph T. McNaney, 8548 Boulder Dr., La Mesa, Calif. 92041

[21] Appl. No.: 114,674

[22] Filed: Jan. 23, 1980

[51] Int. Cl.³ ............................................. G08B 5/36
[52] U.S. Cl. ............................ 340/373.3; 340/366 B; 340/380; 340/766
[58] Field of Search ........... 340/366 R, 366 A, 366 B, 340/373, 378.1, 378.3, 378.4, 378.6, 380, 383, 811, 762, 763, 766

[56] References Cited

U.S. PATENT DOCUMENTS

| | | | |
|---|---|---|---|
| 3,541,542 | 9/1967 | Duguay et al. | 340/811 |
| 4,179,689 | 12/1979 | McNaney | 340/378.3 |

Primary Examiner—Alvin H. Waring

[57] ABSTRACT

Message character image projection control system, utilizing a matrix array of individually shaped light forming windows and a corresponding array of individual electrically responsive light emitting elements in combination with acousto-optic light reflector means for controlling the optical path relationship between illuminated windows in the matrix and a common optical axis of the system, and additional optics for projecting images of the message character toward a light responsive record medium.

6 Claims, 3 Drawing Figures

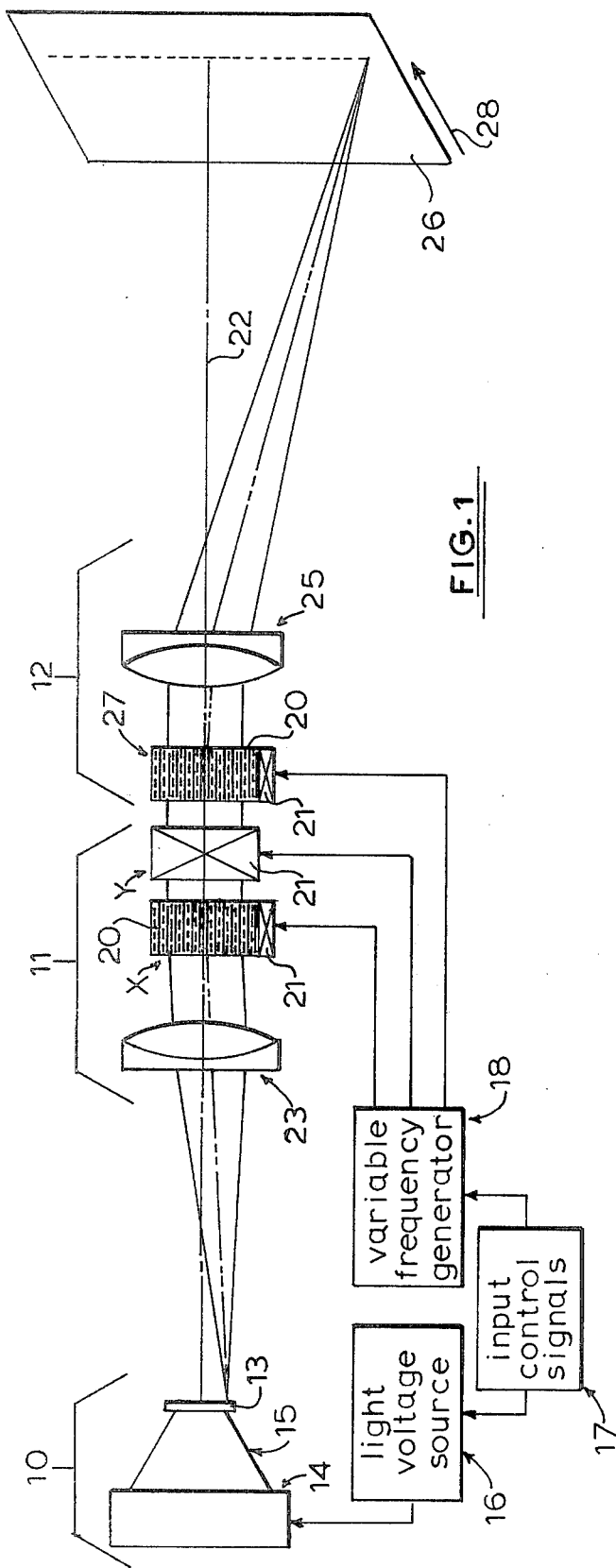
FIG. 1
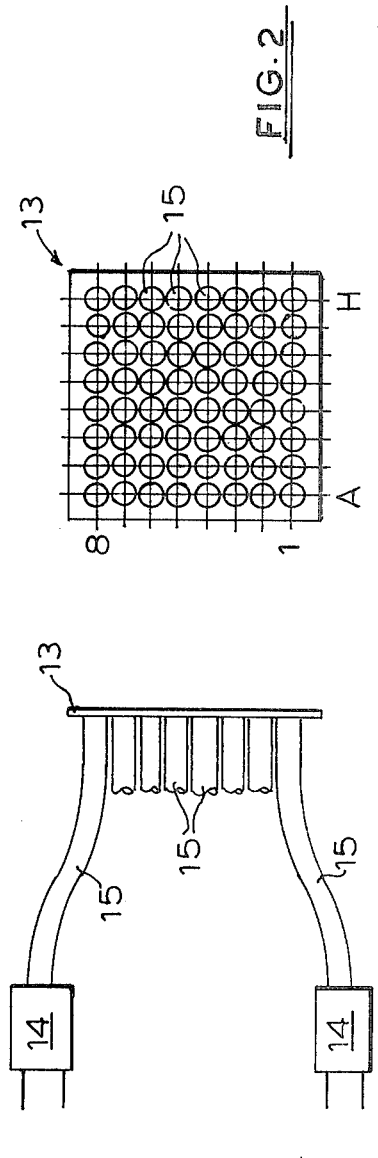
FIG. 2
FIG. 3

MESSAGE CHARACTER IMAGE PROJECTION CONTROL SYSTEM

BACKGROUND OF THE INVENTION

This invention relates to application, Ser. No. 955,111 filed Oct. 26, 1978, now U.S. Pat. No. 4,179,689, wherein the illuminated subject matter is representative of an array of graphic symbol beam forming means and from which images of symbols are derived for recording thereof at the surface of record media.

SUMMARY OF THE INVENTION

The message character image projection control system of this invention includes a matrix array of character shaped light forming windows wherein the source of light includes an array of electrically responsive light emitting elements having circuit means for connecting individual elements, selectively, to a voltage source. Means have been exemplified herein for establishing an optical relationship between an array of light emitting elements and an array of the light forming windows, whereby each window will be exposed to light stemming from a corresponding one of the elements upon a connecting thereof to the source of voltage. Image projection optic means are positioned along a common optical axis of the system and acousto-optic light reflector means, intermediate the array of beam forming windows and projection optic means, are utilized in the effecting of optical path relationships between individual windows in the matrix and the optical axis. Light images of the characters stemming from different off-axis positions of windows in the matrix are directed along the common optical axis and thereupon toward a predetermined line position across the surface of a light responsive record medium.

It is an object of the present invention to improve upon the invention of the aforementioned patent, particularly in regard to means of selectively illuminating windows in a matrix of symbols. A further object, therefore, is to simplify the means to minimize the overall dimensional requirements of the system. Yet another object will be to improve upon the operating efficiency of such system. Embodiments of the invention illustrated and described herein exemplify means for meeting these objectives and read in connection with the drawing hereof the description which follows will provide a better understanding of these and still other objectives of the invention.

BRIEF DESCRIPTION OF THE DRAWING

FIG. 1 is a system embodiment of the invention showing schematically an optical relationship of key elements of at least one such arrangements;

FIG. 2 represents an X and Y arrangement of windows in the matrix, wherein each window is representative of a message character in combination with an array of light emitting elements adjacent to the array of windows; and FIG. 3 will be referred to in describing the alternate means by which windows of the matrix can be illuminated.

DESCRIPTION OF THE INVENTION

Referring now to FIG. 1, the invention as illustrated can best be described and understood as one comprised of three sections, 10, 11 and 12. Section 10 includes a matrix of character shaped windows and light source means; section 11 includes image selector acousto-optic cells and associated optics, and section 12 includes image reflector acousto-optic cell and associated optics. It can noted that neither of the component parts are representative of their real dimensions nor optically related positions in the illustrations.

In FIG. 2, a greatly enlarged view of the matrix 13 is included showing, for example, an 8×8 arrangement of sixty-four window positions in rows 1 to 8, and in columns A to H. In FIG. 3, another view of the matrix 13 is included, showing, as one example, the use of an array of light emitting elements 14, one for each of the sixty-four windows in the matrix, and each having an optical fiber light guide means 15 for directing the light therefrom to a corresponding window in the matrix 13. Depending upon dimensional relationships between center-to-center spacings of windows in the matrix 13 and the nature of the light emitting elements utilized, it may be possible to support the latter closely adjacent to the matrix material, thereby avoiding the use of the light guides 15. However, the present invention lends itself to the use of an array of, for example, sixty-four laser diodes in combination with a very much smaller matrix array of light forming windows and calling for the use of the light guide means 15. Section 10, FIG. 1, includes this particular combination of system elements, matrix 13, laser diodes 14 and light guides 15. The array of diodes 14 are energized, selectively, from a light voltage source 16 under the control of input control signals 17.

Section 11 includes the use of X and Y acousto-optic cells, each of which can be described as having an interaction medium 20 and a transducer 21 to which ultrasonic frequency voltages will be extended from a variable frequency generator 18 under the control of the input signals 17. An object of this portion of the system is to permit, selectively, a viewing of individually illuminated windows at the matrix 13 from along a common optical axis 22. The use of additional optics 23 intermediate the matrix 13 and the image selector cells X and Y permit the aperture of these cells to be filled with a magnified image of a given window, in addition to an allowing of the light rays thereof to follow parallel paths before and after traversing the interaction media 20. When responding to the voltages to its transducer the interaction medium 20 is traversed by compression waves effecting periodic stratification of the medium, their density being proportional to applied acoustic power. The distance between two successive planes of maximum density is equal to the wavelength of a given voltage. Each cell in the system is positioned along the axis 22 whereby the orientation of a given strata, for maximum efficiency, agrees with the Bragg angle relative to the O-order path of light rays through the medium 20. Under these conditions the periodic stratification of the medium allows it to behave like a multiplicity of mirrors, or light guides, each contributing to a bending of light paths through the medium.

The size of individual character shaped light forming windows in the matrix 13, and center-to-center spacing thereof, can be reduced to relatively small dimension through the use of the presently disclosed illuminating system. This is, of course, in line with the objectives of the invention since it allows the scan angles of the image selector acousto-optics, the line scan lengths and the optical path length between the reflection plane thereof and the matrix to be reduced to relative small and practical minimums.

The operation of sections 10 and 11 calls for the exposing of any one of a plurality of character shaped windows in the matrix 13 to a corresponding one of a plurality of individual light beams stemming, respectively, from the array of elements 14, simultaneously, with the establishing of an optical path relationship between an illuminated window and the common optical axis 22 under the control of light reflecting conditions within the medium 20 of the X and Y cells. Section 12 includes additional optics 25 which permits the viewing of an image of each window, upon its illumination, from along the optical axis 22. Light responsive media, such as photographic film material 26, is positioned along the axis to receive the images projected thereon by means of the optics 25, and an output acousto-optic light reflector means 27 controls the placement of these projected images in lines across the film 26. These individual exposures are under the control of voltages from the variable frequency generator 18 under the control of input signals 17 simultaneously with movements of the film in the direction of the arrow 28. The invention lends itself to the use of film material 26 and optic means 25 making it possible to meet the objectives noted, since image size, line lengths thereof across the film, the scan angle requirements of the reflector means 27, and the optical path length between the latter and the film 26 can be reduced to a minium.

The reference to light herein, stemming from the light emitting elements, can include radiant energy which extends from ultraviolet through the visible spectrum to infrared.

Although not shown in FIG. 1, an additional lens system, or the optics 25, can be included along the axis 22 between the cell 27 and the X and Y cells in providing the image projections. And the light responsive media 26 is not to be limited to the use of film material since it is possible to use still other such media.

It should be understood by those skilled in the arts pertaining to the construction of the invention described herein, that the invention includes other modifications and equivalents as they may be seen, but still being within the scope and intent of the appended claims.

I claim:

1. In a message character image projection control system including an array of character shaped light forming windows, a source of light and means for exposing, selectively, windows of said array to light from said source, and optical means positioned along an optical axis of said system for effecting, selectively, an optical path relationship between individual windows of said array and said optical axis, wherein the improvement comprises:

(a) said source of light including an array of electrically responsive light emitting elements;
    (b) a source of voltage and circuit means for connecting said emitting elements of said array, selectively, to a voltage from said source of voltage;
    (c) means for providing an optical relationship between said array of light emitting elements and said array of windows whereby each window will be exposed to light stemming from a corresponding one of the light emitting elements upon the connecting of a voltage from said source to an element;
    (d) said optical means including an acoustic wave generator and an interaction medium positioned along said optical axis, and a source of ultrasonic frequency voltages and circuit means for connecting said generator to this source of voltages for an establishing of any of a number of different acoustic wave light reflecting conditions within said interaction medium, each said optical path relationship corresponding, respectively, to each said light reflecting condition;
    (e) means for connecting a predetermined one of the elements to said source of voltage and, consequently, exposing a corresponding one of the windows to light stemming from said one element, and establishing, simultaneously, a predetermined one of said light reflecting conditions within said medium and a corresponding one of said optical path relationships between said one window and said optical axis;
    (f) means for connecting another predetermined one of the elements to said source of voltage and, consequently, exposing another and corresponding one of the windows to light stemming from said other element, and establishing, simultaneously, another predetermined one of said light reflecting conditions within said medium and a corresponding one of said optical path relationships between said other window and said optical axis.

2. The invention as set forth in claim 1 wherein each said element of said array of light emitting elements is representative of a laser diode source of radiant energy.

3. The invention as set forth in claim 2 wherein said means for providing an optical relationship between said array of light emitting elements and said array of windows includes an optical fiber light guide means extending from each said laser diode source of radiant energy to a corresponding one of said windows.

4. The invention as set forth in claim 1 including additionally lens system means intermediate said array of windows and said interaction medium for projecting a magnified image of the light forming window related to each said light reflecting condition toward said interaction medium.

5. The invention as set forth in claim 4 including additionally ligh responsive record medium means positioned along said optical axis, and lens system means positioned intermediate said interaction medium and said record medium means for projecting said image of the light forming window related to each said light reflecting condition toward said record medium means.

6. The invention as set forth in claim 5 including additional optical means positioned along said optical axis intermediate said interaction medium and said record medium means for controlling the placement of said images of the light forming windows being projected toward said record medium means in a line, one following the other, across said record medium means.

* * * * *